United States Patent
Pauditz et al.

(10) Patent No.: US 10,661,998 B2
(45) Date of Patent: May 26, 2020

(54) METHOD FOR TRANSFERRING A WORKPIECE CARRIER BETWEEN TWO TOOTHED-BELT CONVEYORS

(71) Applicant: STIWA Holding GmbH, Attnang-Puchheim (AT)

(72) Inventors: Michael Pauditz, Schwanenstadt (AT); Norbert Soeser, Oberndorf bei Schwanenstadt (AT)

(73) Assignee: STIWA Holding GmbH, Attnang-Puchheim (AT)

( * ) Notice: Subject to any disclaimer, the term of this patent is extended or adjusted under 35 U.S.C. 154(b) by 319 days.

(21) Appl. No.: 15/746,821

(22) PCT Filed: Jul. 22, 2016

(86) PCT No.: PCT/AT2016/060013
§ 371 (c)(1),
(2) Date: Jan. 29, 2018

(87) PCT Pub. No.: WO2017/015685
PCT Pub. Date: Feb. 2, 2017

(65) Prior Publication Data
US 2020/0079595 A1   Mar. 12, 2020

(30) Foreign Application Priority Data
Jul. 24, 2015 (AT) .............. A 50658/2015

(51) Int. Cl.
*B65G 43/10* (2006.01)
*B65G 35/06* (2006.01)
*B23Q 7/14* (2006.01)

(52) U.S. Cl.
CPC ............. *B65G 43/10* (2013.01); *B65G 35/06* (2013.01); *B23Q 7/1447* (2013.01)

(58) Field of Classification Search
CPC ...... B65G 15/24; B65G 15/42; B65G 17/002; B65G 35/06; B65G 43/10; B23Q 7/1447; B23Q 7/1452
See application file for complete search history.

(56) References Cited

U.S. PATENT DOCUMENTS

| | | | |
|---|---|---|---|
| 6,698,574 B2* | 3/2004 | Frommenwiler | .... B23Q 7/1405 198/465.1 |
| 6,873,882 B2 | 3/2005 | Tachibana et al. | |

(Continued)

FOREIGN PATENT DOCUMENTS

| AT | 413 505 B | 3/2006 |
|---|---|---|
| CN | 103068700 A | 4/2013 |

(Continued)

OTHER PUBLICATIONS

International Search Report of PCT/AT2016/060013, dated Nov. 28, 2016.

*Primary Examiner* — Gene O Crawford
*Assistant Examiner* — Keith R Campbell
(74) *Attorney, Agent, or Firm* — Collard & Roe, P.C.

(57) ABSTRACT

A method for transferring a workpiece carrier in a manufacturing facility from a first conveying portion, which is controlled by a first controller, to a second conveying portion, which is controlled by a second controller is provided. The conveying portions each have a toothed belt. On the basis of an internal timer in the two controllers, a desired position of a virtual tooth space in the transfer region of the conveying portions is calculated, taking the predefined movement speed of the workpiece carrier into consideration and taking the tooth pitch of the toothed belts into consideration. The toothed belts are controlled and synchronized by the respective controller via the drive units such that a first tooth space of the first toothed belt and a second tooth (Continued)

Figure 1:
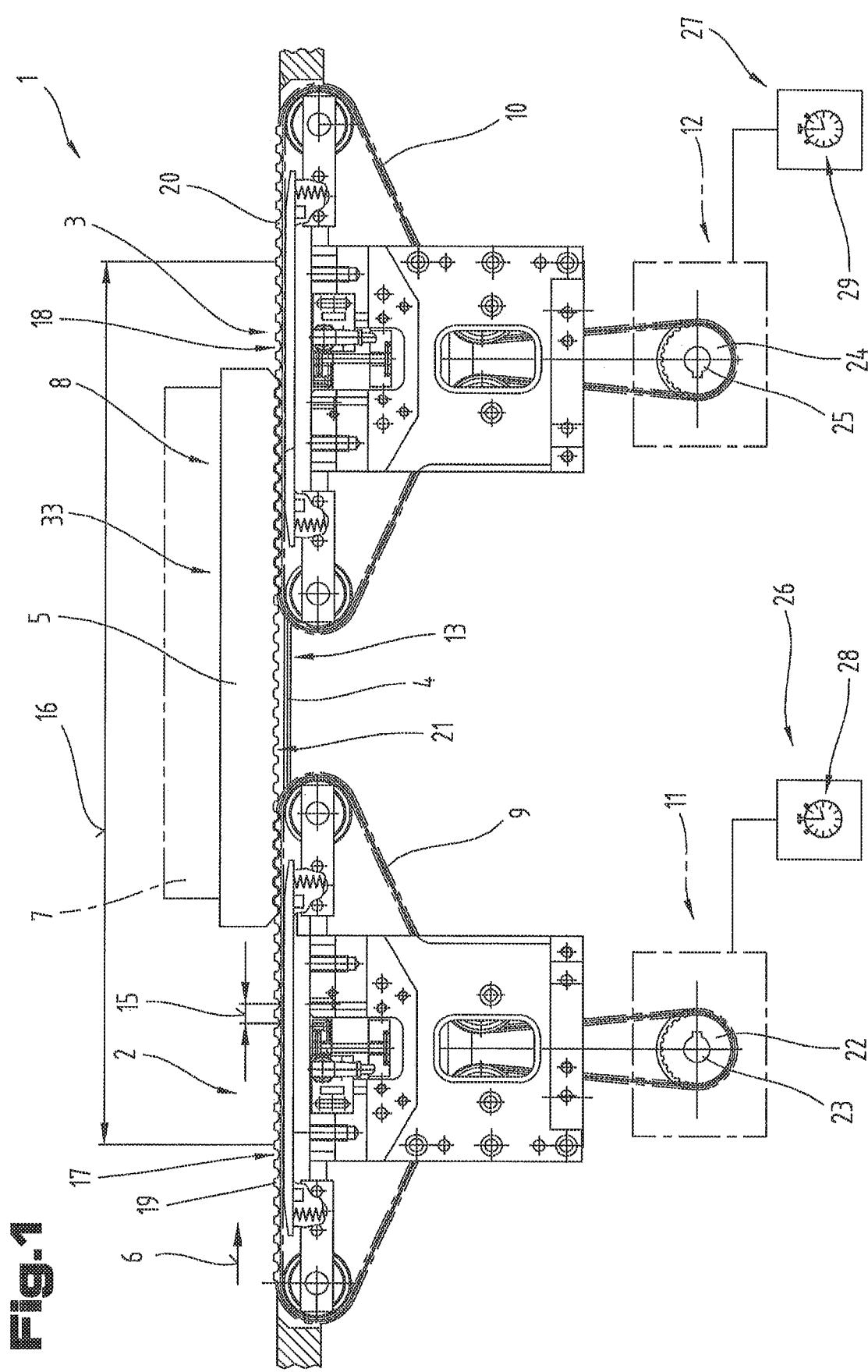

space of the second toothed belt are synchronized with the desired position of the virtual tooth space.

9 Claims, 3 Drawing Sheets

(56) References Cited

U.S. PATENT DOCUMENTS

| | | | |
|---|---|---|---|
| 7,014,033 B2* | 3/2006 | Sticht | B65G 35/06 198/345.3 |
| 8,991,586 B2 | 3/2015 | Hirschek | |
| 9,254,966 B2 | 2/2016 | Fleischmann et al. | |
| 9,714,143 B2 | 7/2017 | Maeder | |
| 10,365,637 B2* | 7/2019 | Mersnik | G05B 19/4183 |
| 10,494,188 B2* | 12/2019 | Zembutsu | B65G 47/52 |
| 2003/0014153 A1 | 1/2003 | Frommenwiler et al. | |
| 2003/0014154 A1* | 1/2003 | Fischer | B23P 21/004 700/213 |
| 2012/0048682 A1 | 3/2012 | Itoh et al. | |

FOREIGN PATENT DOCUMENTS

| | | |
|---|---|---|
| CN | 204916994 U | 12/2015 |
| CN | 205801675 U | 12/2016 |
| DE | 60 221 412 T2 | 4/2008 |
| DE | 10 2011 053145 A1 | 3/2012 |
| DE | 10 2013 209 362 A1 | 11/2014 |
| EP | 1 275 601 A1 | 1/2003 |
| WO | 02/072453 A2 | 9/2002 |
| WO | 2014/166004 A1 | 10/2014 |

* cited by examiner

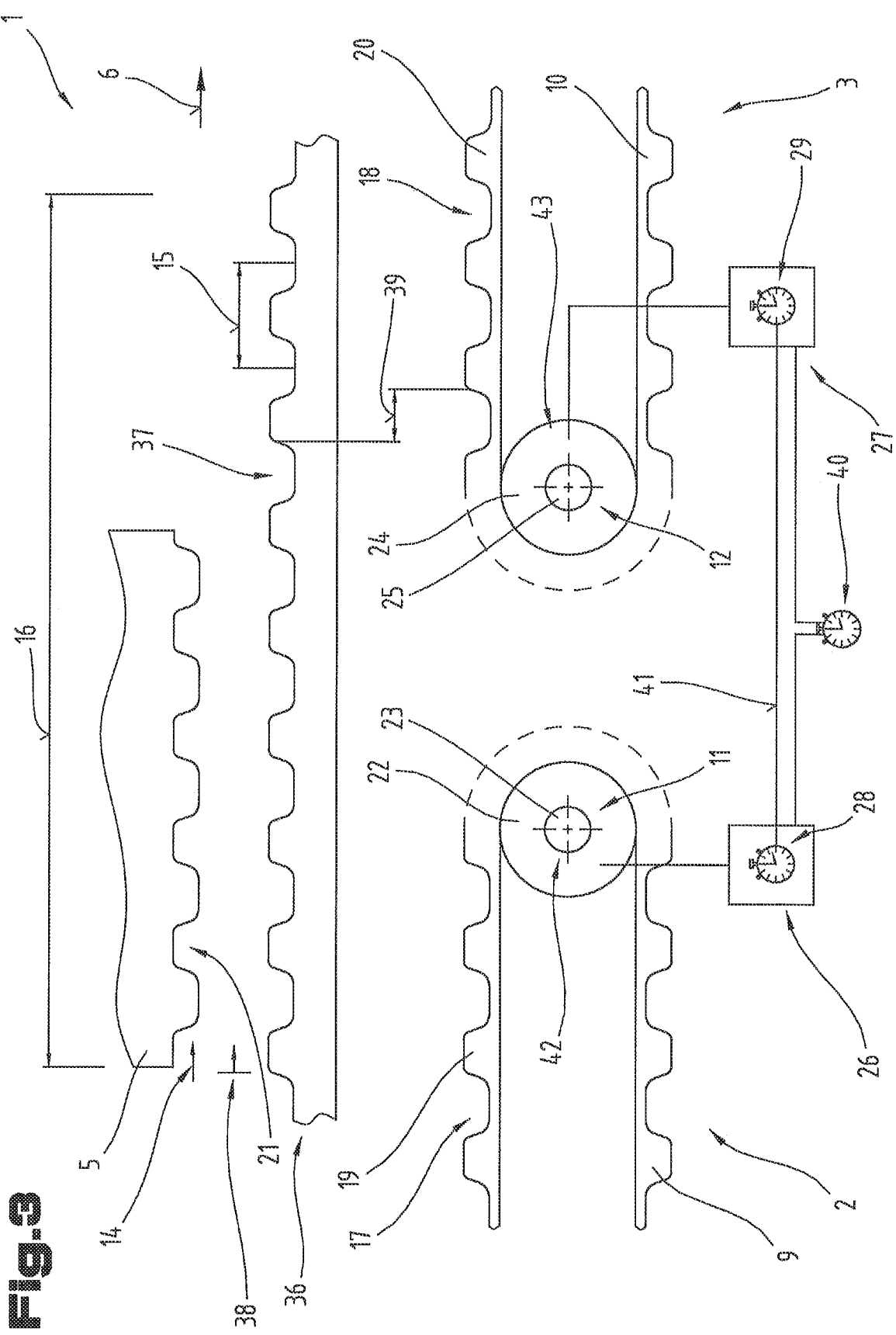

METHOD FOR TRANSFERRING A WORKPIECE CARRIER BETWEEN TWO TOOTHED-BELT CONVEYORS

CROSS REFERENCE TO RELATED APPLICATIONS

This application is the National Stage of PCT/AT2016/060013 filed on Jul. 22, 2016, which claims priority under 35 U.S.C. § 119 of Austrian Application No. A50658/2015 filed on Jul. 24, 2015, the disclosure of which is incorporated by reference. The international application under PCT article 21(2) was not published in English.

The invention relates to a method for transferring a workpiece carrier in a manufacturing facility from a first conveying portion to a second conveying portion.

AT413505 B describes a general structure of a generic manufacturing facility. The manufacturing facility comprises a first conveying portion, which is controlled by a first controller, and a second conveying portion, which is controlled by a second controller, the workpiece carrier being guided in a guide arrangement in the manufacturing facility, and the conveying portions each comprising a toothed belt, said toothed belts each being driven by means of a pinion arranged on a shaft of a drive unit, and said toothed belts engaging in a corresponding tooth system of the workpiece carrier, the workpiece carrier being displaced along the guide arrangement by the toothed belts, and both the first toothed belt and the second toothed belt being in operative connection with the tooth system of the workpiece carrier in a transfer region.

In manufacturing facilities of the prior art, when transferring the workpiece carrier, the current position of the second toothed belt is queried by the controller of the first conveying portion and/or the current position of the first toothed belt is queried by the controller of the second conveying portion. As a result, both toothed belts can be synchronized, although the position of both toothed belts needs to be detected by the respective other controller at all times.

This method for transferring the workpiece carrier from the first conveying portion to the second conveying portion as used in manufacturing facilities of the prior art has the disadvantage that a sensor and a data line are required to query the position of the toothed belts. If a fault arises when transmitting the position signal during the transfer process or the sensor fails or displays a fault, there is a risk of damage to the manufacturing facility due to the toothed belts not being synchronized.

EP 1275601 A1 relates to a method and a device for transferring workpieces which are processed in at least one first group of workstations and in at least one second group of workstations on a manufacturing line, wherein one first transfer device moves workpiece carriers with the workpieces from workstation to workstation in the first group, and a second transfer device moves workpiece carriers with the workpieces from workstation to workstation in the second group, the first transfer device transferring the workpiece carriers to a transport device, and the transport device passing the workpiece carriers to the second transfer device.

The object of the present invention is to provide an improved method for transferring the workpiece carrier from the first conveying portion to the second conveying portion.

This object of the invention is achieved by the method described in claim 1.

The invention provides for a method for transferring a workpiece carrier in a manufacturing facility from a first conveying portion, which is controlled by a first controller, to a second conveying portion, which is controlled by a second controller, the workpiece carrier being moved in a guide arrangement in the manufacturing facility, and the conveying portions each comprising a toothed belt, said toothed belts each being driven by means of a pinion arranged on a shaft of a drive unit, and said toothed belts engaging in a corresponding tooth system of the workpiece carrier, the workpiece carrier being displaced along the guide arrangement by the toothed belts, and both the first toothed belt and the second toothed belt being in operative connection with the tooth system of the workpiece carrier in a transfer region. On the basis of an internal timer in the two controllers, a desired position of a virtual tooth space in the transfer region of the conveying portions is calculated, taking the predefined movement speed of the workpiece carrier into consideration, and taking the tooth pitch of the toothed belts into consideration, the toothed belts being controlled and synchronized by the respective controller via the drive units such that both a first tooth space of the first toothed belt and a second tooth space of the second toothed belt are synchronized with the desired position of the virtual tooth space.

One advantage of the method according to the invention is that the first controller and the second controller do not need to be connected together by a sensor unit or a corresponding data line when transferring the workpiece carrier in order to ensure that the first toothed belt and the second toothed belt are synchronized. As a result, the likelihood of errors during the transfer process or the risk of mechanical damage due to defective data lines can be reduced.

It may also be expedient if the internal timers of both controllers are synchronized at predefined intervals. In this respect it is advantageous if synchronicity of the two internal timers in the controllers is restored after a certain time if they fall out of synchronization. This can compensate for any inaccuracy of the timers in the controllers. This ensures that the workpiece carrier can be transferred safely even after long periods of operation, without imposing extremely high requirements on the quartz crystals in the timers.

The internal timers in the two controllers may also be synchronized before moving the workpiece carrier into the transfer region. These measures make it possible to synchronize the internal timers at any time if this is necessary in order to ensure that the workpiece carrier is transferred seamlessly.

In addition, each tooth space of the toothed belts may be synchronized with the adjacent virtual tooth space. In this case it is advantageous that the time taken to ensure synchronicity of the two toothed belts can be reduced to a minimum.

It is also advantageous to provide a form in which it is possible to arrange for the two controllers to calculate a desired angular position of the shafts of the drive units by means of the desired position of the virtual tooth space, and by means of the geometric data for the pinions, the angular positions of the shafts being synchronized and monitored if applicable. The direct parameters of the controller can be monitored or adjusted as a result.

According to one development it is possible for the desired position of the virtual tooth space to be calculated on the basis of the time units that have elapsed since a reference time, the virtual tooth space moving from a reference position. In this case it is advantageous that the data volumes to be processed by each controller can be minimized as a result.

It may also be expedient to select the last synchronization time of the internal timers of the two controllers as the reference time. It has been shown to be useful to select the last synchronization time as the reference time, as this is the time at which it is possible to guarantee that the two controllers display the same time basis. The time units that have elapsed since this time are therefore as small as possible, which makes it possible to minimize the data volume to be processed:

A master timer may also be defined to synchronize the internal timers of the two controllers, and the time is obtained from said master timer. In a combination comprising a plurality of controllers such a master timer may be created by means of an overriding timer unit, for example. In an alternative version, it is also conceivable to define the internal timer in one of the controllers as the master timer. It is important to ensure that the internal timers in the individual controllers display times that are synchronous with each other. In this case it is not necessary for this synchronous time to match the time measured by atomic clock.

Two timers may also be used as internal timers in the two controllers, said timers displaying the same clock rate resolution accuracy. In this case it is advantageous if a selected time unit for specifying the desired position of the virtual tooth space can also be resolved by the additional controller (s).

According to a specific form, it is possible, when using two internal timers in the two controllers, which have a different clock rate resolution accuracy, to calculate the desired position of the virtual tooth space on the basis of the clock rate of the timer with the lower resolution accuracy. By taking these measures, it is possible to ensure that a time unit or a corresponding tooth space position, which cannot be resolved by one of the two controllers, is not calculated erroneously.

A time unit as defined by this document is dependent on the clock rate, also known as the clock frequency, of the internal timers and corresponds to the smallest unit of time that can be resolved by the timer. The clock rate of the internal timers is preferably generated by a quartz crystal.

Figure 2:
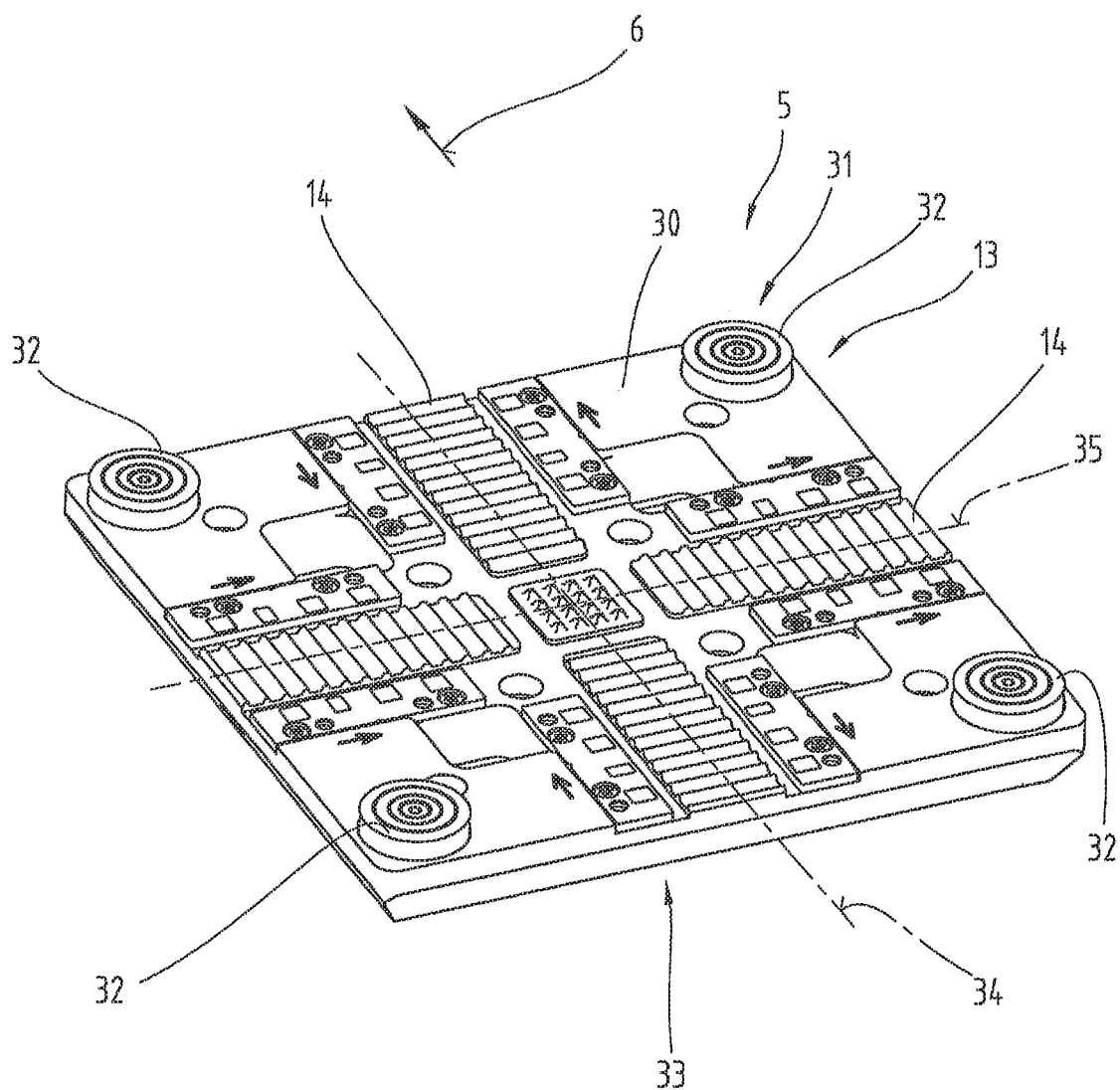

To facilitate understanding of the invention, it is explained below in greater detail with the aid of the following figures, which show highly simplified schematic representations of the following:

FIG. 1 a side view of the manufacturing facility as a schematic representation;

FIG. 2 a perspective view of the workpiece carrier obliquely from below;

FIG. 3 a schematic representation of synchronization of the two toothed belts.

By way of an introduction, it is noted that the same components are provided with the same reference numerals or the same component names in embodiments with different descriptions, which means that the disclosures contained in the description as a whole can be transferred accordingly to the same components with the same reference numerals or the same component names. Selected location information in the description, such as, for example, above, below, at the side of, etc, also refers to the figure immediately described and illustrated, and this location information should be transferred accordingly to the new location if this location changes.

FIG. 1 shows a schematic side view of the manufacturing facility 1 with a first conveying portion 2 and, a second conveying portion 3 adjacent to said first portion. The conveying portions 2, 3 comprise a guide arrangement 4 by means of which a workpiece carrier 5 can be guided or held in position. The workpiece carrier 5 can thus be positively guided by the guide arrangement 4, said workpiece carrier being held in the guide arrangement 4 such that it can be displaced in the displacement direction 6.

The workpiece carrier 5 is particularly intended to hold a workpiece 7 for processing. In particular, one or more fixing or clamping devices may be provided on an upper face 8 of the workpiece carrier 5, said devices serving to attach the workpiece 7 to the workpiece carrier 5. In another different embodiment of the invention it is proposed that the workpiece 7 may be laid loosely on the workpiece carrier 5, said workpiece carrier 5 having corresponding receptacles for the workpiece 7.

As is also shown in FIG. 1, it is proposed that the first conveying portion 2 should comprise a first carrier element, in particular a first toothed belt 9. Similarly, the second conveying portion 3 comprises a second carrier element, in particular a second toothed belt 10. The first toothed belt 9 is driven by a first drive unit 11 and the second toothed belt 10 is driven by a second drive unit 12.

In particular, a tooth system 14 may be formed on a lower face 13 of the workpiece carrier 5, said toothed system corresponding to the toothed belts 9, 10. The tooth system 14 preferably comprises the same tooth pitch 15 as the toothed belts 9, 10.

If the workpiece carrier is located 5 in a transfer region 16 between the first conveying portion 2 and the second conveying portion 3, both the first toothed belt 9 and the second toothed belt 10 engage with the tooth system 14 of the workpiece carrier 5. It is therefore necessary for both toothed belts 9, 10 to move synchronously during this period, and also for a tooth space 17 in the first toothed belt 9 and a tooth space 18 in the second toothed belt 18 to be positioned in relation to one another in accordance with the tooth pitch 15. In particular, a first tooth 19 of the first toothed belt 9 and a second tooth 20 of the second toothed belt 10 engage in a tooth space 21 in the tooth system 14 of the workpiece carrier 5.

The guide arrangement 4 may extend over the entire length of the manufacturing facility 1, the workpiece carrier 5 being able to be displaced freely in the guide arrangement 4. The workpiece carrier 5 can only be positively guided in its position along the guide arrangement 4 by the toothed belts 9, 10.

As is also shown in FIG. 1, the first drive unit 11 comprises a first pinion 22, by means of which the first toothed belt 9 is driven. The first pinion 22 is arranged on a first shaft 23. The second drive unit 12 comprises a second pinion 24 by means of which the second toothed belt 10 is driven. The second pinion 24 is arranged on a second shaft 25.

In the manufacturing facility 1 according to the invention, a first controller 26 is provided to control the first conveying portion 2 and a second controller 27 is provided to control the second conveying portion 3. The first controller 26 comprises a first internal timer 28 and the second controller 27 comprises a second internal timer 29.

FIG. 2 shows a perspective view of a workpiece carrier 5. The view is oriented such that the lower face 13 of the workpiece carrier 5 is visible. As shown in FIG. 2, the workpiece carrier 5 may comprise a workpiece carrier body 30 on which a wide variety of elements may be arranged. In particular, a guide arrangement 31 may be arranged on the lower face 13 of the workpiece carrier body 30, said guide arrangement corresponding to the guide arrangement 4 of the manufacturing facility 1 and thus the workpiece carrier 5 can be positively guided.

The guide arrangement 31 may in particular be formed by four guide rollers 32. The guide rollers 32 may have contouring around their circumference, which corresponds to corresponding opposite contouring on the guide arrangement 4. In particular, the guide rollers 32 may have a V-shaped recess and the guide arrangement 4 may have a correspondingly diametrically opposite v-shaped protrusion. However, as a general rule, any type of contour may be used to form the guide arrangement 4.

A workpiece receptacle 33, in which the workpiece 7 may be held, may be arranged on the upper face 8 of the workpiece carrier 5, particularly on the workpiece carrier body 30. The workpiece receptacle 33 is not visible in the representation shown in FIG. 2.

As is also shown in FIG. 2, the workpiece carrier body 30 may substantially be designed to be symmetrical in relation to a first plane of symmetry 34 and/or in relation to a second plane of symmetry 35. The tooth system 14 may also be formed in the middle of the workpiece carrier body 30 in both orientation directions. The tooth system 14 is designed to be diametrically opposite the toothed belt 9, 10 so that it corresponds to said toothed belt and the workpiece carrier 5 can thus be displaced as a result.

FIG. 3 shows another, possibly independent embodiment of the manufacturing facility 1, again using the same reference numerals or component descriptions as used in FIGS. 1 and 2 above for the same parts. In order to avoid unnecessary repetitions, reference is made to the detailed description in FIGS. 1 and 2 above.

FIG. 3 shows a schematic representation of the method for transferring the workpiece carrier 5 from the first conveying portion 2 to the second conveying portion 3.

As shown in FIG. 3, a virtual toothed belt 36 is calculated by both the first controller 26 and the second controller 27, said toothed belt being located in a certain position at a certain time. A virtual tooth space 37 is calculated in particular, said tooth space moving at a predefined movement speed in the displacement direction 6.

In particular, the virtual tooth space 37 may start to move from a reference position 38 at a reference time and it may start to move in the displacement direction 6 at the predefined movement speed. As a result, the precise desired position of the virtual tooth space 37 can be calculated at any point in time after the reference time. There are of course a plurality of virtual tooth spaces 37 depending on the tooth pitch 15.

The workpiece carrier 5 is transported by the first toothed belt 9 in the first conveying portion 2, the first tooth 19 of the first toothed belt 9 engaging in the tooth space 21 in the tooth system 14. The workpiece carrier 5 and the first toothed belt 9 are thus positively connected to one another and the workpiece carrier 5 is positioned in the displacement direction 6 by the first toothed belt 9.

If the workpiece carrier 5 is outside the transfer region 16, the second toothed belt 10 may be at a standstill. Before the workpiece carrier 5 enters the transfer region 16, the second toothed belt 10 is set in motion, wherein the tooth space 18 of the second toothed belt 10 is synchronized with the virtual tooth space 37 of the virtual toothed belt 36. As both the first toothed belt 9 and the second toothed belt 10 are synchronized with the virtual toothed belt 36, the workpiece carrier 5 can be seamlessly moved into the transfer region 16, the first toothed belt 9 and the second toothed belt 10 engaging with the workpiece carrier 5 in the transfer region 16.

In order to ensure synchronicity of both toothed belts 9, 10, it is not necessary for the first controller 26 to detect the current position of the second toothed belt 10 and/or the second controller 27 to detect the current position of the first toothed belt 9, but the desired position of the virtual tooth space 37 is calculated based on the reference position 38 and on the time that has elapsed since the reference time.

When the workpiece carrier 5 is moved out of the transfer region 16, it is conceivable that the first toothed belt 9 will be switched to a standstill to save energy, for example.

When synchronizing the tooth space 17 of the first toothed belt 9 or the tooth space 18 of the second toothed belt 10 with the virtual tooth space 37, the tooth space 17 or 18 respectively may be synchronized with the adjacent virtual tooth space 37. As a result of this measure it is possible to ensure that a synchronizing interval 39 amounts to no more than one half tooth pitch 15.

As the virtual toothed belt 36 is calculated by both the first controller 26 and the second controller 27 independently of one another, it is necessary for the internal times of both controllers 26, 27 to run absolutely synchronously. At the very least this is essential while the workpiece carrier 5 is in the transfer region 16. In particular, the current time on the first internal timer 28 must agree with the current time on the second internal timer 29.

In the illustration shown in FIG. 3, the first toothed belt 9 is synchronized with the virtual toothed belt 36 and the second toothed belt 10 is not synchronized with the virtual toothed belt 36.

Due to inaccuracies in the quartz crystals, which are responsible for the clock rate of the internal timers 28, 29, it is possible that the two internal times of the internal timers 28, 29 may shift over a certain period of time and thus no longer be synchronous with each other. It may therefore be necessary to synchronize the internal timers 28, 29 of both controllers 26, 27 at predefined intervals. In particular, it has been shown to be advantageous if the internal timers 28, 29 of both controllers 26, 27 are synchronized before the workpiece carrier 5 is moved into the transfer region 16. This measure ensures that the virtual toothed belt 36 is calculated synchronously by the first controller 26 and by the second controller 27.

In a first embodiment of the invention it is possible for both internal timers 28, 29 to obtain the synchronous time from a master timer 40 in order to synchronize said internal timers. Such a master timer 40 may for example be formed by a highly accurate central clock.

In another embodiment of the invention, the two timers 28, 29 may also have a direct connection 41 with one another, and one of the two timers 28, 29 may function as a master timer and specify the current time.

As a general rule it is not necessary for the time in the internal timers 28, 29 to also correspond to the actual time, but it is merely necessary for the time in the internal timers 28, 29 to run synchronously in relation to one another.

An error message or a warning may also be issued if scheduled synchronization tests on both timers 28, 29 do not work properly. For example, a maximum period may be defined in which the timers 28, 29 must absolutely be synchronized. This period may be calculated approximately from the inaccuracy of both timers 28, 29 and therefore from the resulting time difference, and from the maximum permitted toothed belt position deviation. This thus ensures that there is no damage to one of the toothed belts 9, 10 or the workpiece carrier 5 during operation of the manufacturing facility 1 due to non-synchronicity of the two toothed belts 9, 10.

Of course, the described mechanisms do not only apply to two conveying portions 2, 3, but may also be applied to any number of conveying portions with any number of controllers.

In particular, it has been shown to be useful if two timers with the same clock rate resolution accuracy are used as internal timers 28, 29 in both controllers 26, 27.

However, in an alternative version, it is also possible to use two internal timers 28, 29 with a different clock rate resolution accuracy, the desired position of the virtual tooth space 37 being calculated on the basis of the clock rate for the timer 28, 29 with the lower resolution accuracy. If, for example, the first timer 28 has a resolution accuracy of 2 nanoseconds and the second timer 29 has a resolution accuracy of 1 nanosecond, the current desired position of the virtual tooth space 37 is calculated in 2-nanosecond steps.

It is also conceivable that a desired angular position of the shafts 23, 25 may be calculated by means of geometric data for the toothed belt 9, 10 or the pinions 22, 24. In particular, the angular positions of the shafts 23, 25 may in this case be monitored by a first angle measurement device 42 or by a second angle measurement device 43. As a result, it is possible to compare the actual position of the toothed belt 9, 10 with the desired position in the controller 26, 27.

Electric motors, and in particular servomotors, may be used as a drive unit 11, 12, the angle measurement devices 42, 43 forming a direct integral part of these motors.

The embodiments illustrate possible variations of the manufacturing facility 1, with the proviso that the invention is not restricted to the variations of these embodiments specifically described, but that various combinations of the individual variations of the embodiments are also possible, and these possible variations lie within the abilities of persons skilled in the art in this technical field on the grounds of teaching in relation to technical possibilities posed by the present invention.

Individual features or combinations of features from the different illustrated and described embodiments may also represent independent innovative solutions or solutions according to the invention.

The object forming the basis for the independent innovative solutions can be found in the description.

All information relating to ranges of values in the description of the invention should be understood as including any and all partial regions of these ranges, e.g. specifying 1 to 10 should be understood to mean that all partial ranges from the lower limit of 1 and the upper limit of 10 are included, i.e. all partial ranges begin with a lower limit of 1 or higher and end with an upper limit of 10 or lower, e.g. 1 to 1.7, or 3.2 to 8.1, or 5.5 to 10.

Above all, the individual embodiments illustrated in FIGS. 1, 2, and 3 may constitute the object of independent solutions according to the invention. The related objects and solutions according to the invention can be found in the detailed descriptions of these figures.

Finally, as a matter of form, it should be noted that the manufacturing facility 1 or its component parts are sometimes not shown to scale and/or may be enlarged and/or reduced in size to facilitate understanding of the overall structure.

List of reference numerals

| | |
|---|---|
| 1 | manufacturing facility |
| 2 | first conveying portion |
| 3 | second conveying portion |
| 4 | guide arrangement |
| 5 | workpiece carrier |
| 6 | displacement direction |
| 7 | workpiece |
| 8 | upper face of workpiece carrier |
| 9 | first toothed belt |
| 10 | second toothed belt |
| 11 | first drive unit |
| 12 | second drive unit |
| 13 | lower face of workpiece carrier |
| 14 | tooth system |
| 15 | tooth pitch |
| 16 | transfer region |
| 17 | tooth space first toothed belt |
| 18 | tooth space second toothed belt |
| 19 | first tooth first toothed belt |
| 20 | second tooth second toothed belt |
| 21 | tooth space tooth system |
| 22 | first pinion |
| 23 | first shaft |
| 24 | second pinion |
| 25 | second shaft |
| 26 | first controller |
| 27 | second controller |
| 28 | first internal timer first controller |
| 29 | second internal timer second controller |
| 30 | workpiece carrier body |
| 31 | guide device |
| 32 | guide roller |
| 33 | workpiece receptacle |
| 34 | first plane of symmetry |
| 35 | second plane of symmetry |
| 36 | virtual toothed belt |
| 37 | virtual tooth space |
| 38 | reference position |
| 39 | synchronization interval |
| 40 | master timer |
| 41 | direct connection |
| 42 | first angle measurement device |
| 43 | second angle measurement device |

The invention claimed is:

1. A method for transferring a workpiece carrier in a manufacturing facility from a first conveying portion to a second conveying portion, the method comprising the steps of:
   guiding the workpiece carrier in a guide arrangement of the manufacturing facility;
   providing the first conveying portion with a first toothed belt and providing the second conveying portion with a second toothed belt;
   driving the first toothed belt with a first pinion arranged on a first shaft of a first drive unit and driving the second toothed belt with a second pinion arranged on a second shaft of a second drive unit;
   engaging the first toothed belt and the second toothed belt with a corresponding tooth system of the workpiece carrier;
   displacing the workpiece carrier along the guide arrangement via the first toothed belt and the second toothed belt;
   operatively connecting both the first toothed belt and the second toothed belt with the tooth system of the workpiece carrier in a transfer region;
   controlling the first conveying portion by a first controller and controlling the second conveying portion by a second controller;
   providing a first internal timer in the first controller and a second internal timer in the second controller;

calculating a desired position of a virtual tooth space in the transfer region of the first conveying portion and the second conveying portion on the basis of the first internal timer and the second internal timer, taking a predefined movement speed of the workpiece carrier into consideration and taking a tooth pitch of the first toothed belt and the second toothed belt into consideration;

controlling and synchronizing the first toothed belt by the first controller via the first drive unit and controlling and synchronizing the second toothed belt by the second controller via the second drive unit such that a first tooth space of the first toothed belt and a second tooth space of the second toothed belt are synchronized with the desired position of the virtual tooth space;

calculating the desired position of the virtual tooth space on the basis of the time units that have elapsed since a reference time; and moving the virtual tooth space from a reference position.

2. The method according to claim 1, further comprising the step of synchronizing the first internal timer and the second internal timer at predefined intervals.

3. The method according to claim 1, further comprising the step of synchronizing the first internal timer and the second internal timer before moving the workpiece carrier into the transfer region.

4. The method according to claim 1, further comprising the step of synchronizing the first tooth space and the second tooth space with a respective adjacent virtual tooth space.

5. The method according to claim 1, wherein the first controller and the second controller calculate a desired angular position of the first shaft and the second shaft via the desired position of the virtual tooth space and via geometric data for the first pinion and the second pinion.

6. The method according to claim 1, wherein a last synchronization time of the first internal timer and the second internal timer is selected as the reference time.

7. The method according to claim 1, further comprising the steps of defining a master timer to synchronize the first internal timer and the second internal timer and obtaining the time from said master timer.

8. The method according to claim 1, wherein two timers are used as the first internal timer and the second internal timer and the two timers display the same clock rate resolution accuracy.

9. The method according to claim 1, wherein, the first internal timer and the second internal timer have a different clock rate resolution accuracy, and the desired position of the virtual tooth space is calculated on the basis of the clock rate of the respective first internal timer or second internal timer with a lower resolution accuracy.

* * * * *